June 10, 1958
G. W. WATTLES, JR
2,838,358
BRAKE EFFICIENCY RECORDER
Filed Feb. 23, 1954
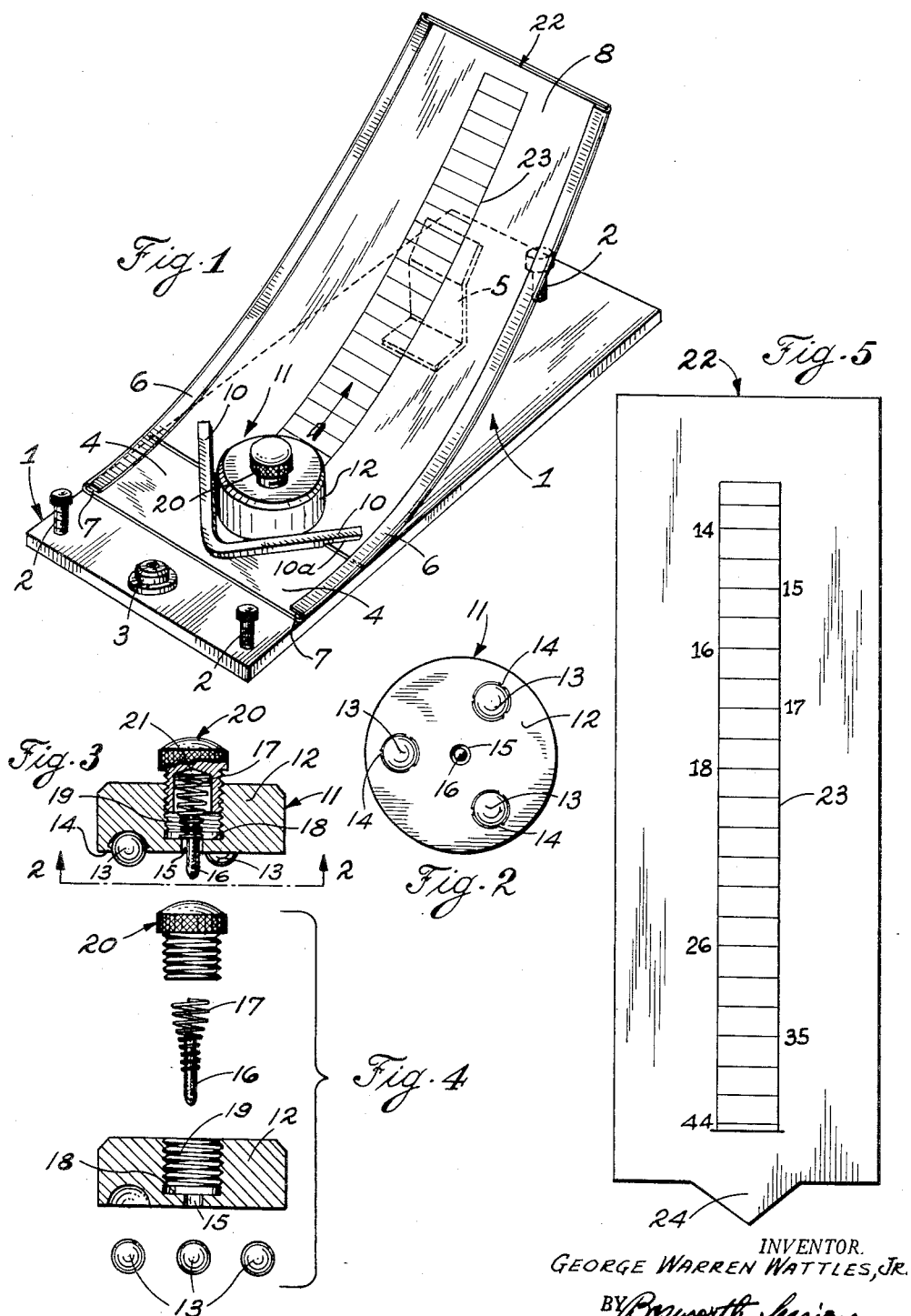
INVENTOR.
GEORGE WARREN WATTLES, JR.
BY Bosworth, Sessions,
Herrstrom & Williams
ATTORNEYS

# United States Patent Office 2,838,358
Patented June 10, 1958

2,838,358
BRAKE EFFICIENCY RECORDER
George Warren Wattles, Jr., Shaker Heights, Ohio Application February 23, 1954, Serial No. 411,996

15 Claims. (Cl. 346—7)

This invention relates to a device for measuring brake efficiency and, more particularly, to a device of this kind adapted to leave a lasting record on a suitable recording surface incorporated in or forming part of the device.

It is of course known that a weight or similar object that is free to move over a surface fixedly mounted in a traveling vehicle will, under the influence of inertia forces, continue to move over the surface independently of the vehicle itself when the brakes are applied. In the past, efforts have been made to take advantage of this fact, as, for example, in Blanchard Patent No. 1,842,384, by providing one or more weights adapted to follow prescribed paths, depending on the speed of the vehicle. In general, devices of this sort have not found practical application, partly because of the lack or impermanence of the record that can be obtained. In the ordinary case, so far as known, there is no record to which reference can be had after the weights have been returned to their original positions.

There is, however, considerable interest on the part of automobile service establishments in having a brake efficiency recorder available which can be used when desired in different vehicles; for example, vehicles left with the establishment for a short period of time for servicing. In dealing with the owner of the vehicle, it is helpful to be able to show graphically the results of a test of brake efficiency, which usually can be done only if there is a permanent or semi-permanent record. One of the principal objects of the invention is to provide a brake efficiency recorder useful for these purposes in which a record or trace is left from which the condition of the brakes and the need for any adjustment of them can readily be interpreted, this even if a long period of time elapses before such interpretation can be made.

Other objects and advantages of the invention will be apparent from the description which follows and from the accompanying drawings, in which:

Figure 1 is a perspective of a brake efficiency recorder embodying the features of the invention showing a suitable form of marking device that may be used therewith.

Figure 2 is a bottom plan of the marking device.

Figure 3 is a transverse section, but with parts in elevation, through the axis of figure of the marking device.

Figure 4 is an exploded view of the parts of the marking device.

Figure 5 represents a paper insert of the nature of a chart which may be used as the recording surface in the brake efficiency recorder.

As is apparent from Figure 1, the brake efficiency recorder of the invention includes a base portion 1 which is preferably formed of thick metal plate. At the ends thereof are adjusting screws 2 which project through threaded openings in base portion 1 into contact with the floor of the vehicle in which the brake efficiency recorder is being used. At the near or anterior end of the base portion as seen in Figure 1 is a level 3. In locating the brake efficiency recorder on a vehicle floor, adjusting screws 2 are used to make sure that base portion 1 is horizontal.

Extending upward from base portion 1 in a smooth curve from a zone of tangency near the anterior end thereof is an inclined metal slide portion 4. As seen from either side, the shape of slide portion 4 approximates a parabola. Slide portion 4 may be affixed to base portion 1 in any suitable way but is preferably welded to it, usually at the zone of tangency. Base portion 1 is actually somewhat shorter than slide portion 4, but the parabolic nature of the curve keeps the slide portion from projecting very much beyond the far end of the base portion. Near its upper end, the slide portion is supported by a bracket 5, shown in dotted lines in Figure 1, which is welded to base portion 1 and slide portion 4. In general, the slide portion overlies the base portion except as room is left for adjusting screws 2 and level 3.

The slide portion is provided with retaining elements 6 along the lateral edges thereof, such retaining elements serving to keep the marking device from dropping off the slide portion between the ends thereof. In the preferred embodiment of the invention, the retaining elements take the form of inturned flanges formed integrally with the metal stock of which the slide portion is itself formed. If the flanges are turned inward in this manner, there will be formed beneath them the grooves 7 shown in Figure 1. As hereinafter explained, these grooves may in some circumstances be utilized as ways, although it is not necessary to the practice of the invention that they be so used.

A suitable recording surface 8 covers most of the upper face of slide portion 4. Such recording surface is preferably ruled into zones or divisions the purpose of which will be more clearly apparent from the explanation which follows. In some circumstances, recording surface 8 may be the exposed surface of slide portion 4, particularly if the latter is so formed or coated that the necessary zones or divisions can be inscribed therein; however, in the preferred form of the invention use is made of a paper insert, illustrated in Figure 5, which is positioned over slide portion 4. Where such paper insert is used, it of course constitutes the recording surface.

Near the anterior end of slide portion 4 is a V-shaped metal stop 10. The end portions of stop 10 are preferably undercut as at 10a to permit the paper insert, if one is used, to extend under the proximate ends of the stop. The stop itself is so formed that the included angle or bight measures 90°. It is incorporated in the device to provide a fixed point of departure for the metal marking device indicated generally at 11.

As appears from Figures 2, 3 and 4, such marking device consists of a massive body portion 12 of metal in the flat lower face of which are three equally spaced semi-spherical recesses for accommodating a like number of freely-rotatable bearing balls 13. Any convenient means may be employed for holding bearing balls 13 in place in the recesses in the lower face of marking device 11. In the form of the invention shown, body portion 12 is peened over as at 14 to provide means for retaining the bearing balls in place.

As further appears from Figures 2, 3 and 4, a narrow bore 15 extends upward from the lower face of the marking device. Such bore is provided for the purpose of accommodating a spring-biased stylus or marking element 16 which may be of graphite, crayon or the like. Marking element 16 may conveniently be held firmly in place in the narrow end of a two-stage coil spring 17, best seen in Figure 4. The narrow end of spring 17, which end receives marking element 16, is of such dimensions that it can bear against a shoulder 18 formed at the base of a tapped opening 19 in body portion 12. Cooperating with the threads in tapped opening 19 is a threaded spring retainer 20 provided with an interior recess 21 accommodating the wide end of spring 17. After having been compressed, the full length of spring 17 can be accommodated between shoulder 18 and retainer 20 with marking element 16 projecting downward through bore 15 as shown in Figure 3.

If the recording surface 8 is not on the exposed top surface of slide portion 4 but on a paper insert of the kind to which reference has already been made, such insert may take the form shown in Figure 5. As there shown, insert 22 is provided with a printed scale 23 which is itself divided into numbered zones to correspond to the distance in feet required to bring the vehicle to a full stop at a given speed. In general, insert 22 is rectangular in shape; however, at its lower end it may be provided with a triangular tab 29 that conforms in shape to the bight in stop 10. Thus when insert 22 is positioned in grooves 7 of retaining elements 6, which in such case serve as ways, tab 24 engages portions of stop 10. Insert 22 is, of course, of such overall length as to conform generally to the length of slide portion 4, although it may be shorter if desired.

When the brake efficiency recorder has been set up and leveled, the vehicle in which it is being used is brought up to the intended testing speed, say 20 miles per hour. With the vehicle operating at this speed on a smooth stretch of highway, the operator removes his hands from the steering wheel and applies the brakes in an attempt to bring the vehicle to a halt as promptly as possible. In such circumstances, marking device 11, which is free to move in an upward path over recording surface 8, continues to move as the vehicle is brought to a halt. In doing so, marking device 11 makes a trace on the recording surface taking the form of a first line corresponding to the upward movement of the marking device and a second line, usually coinciding or nearly coinciding with it, showing the return path of the marking device as it falls back under the influence of gravity to its initial position.

The height of the trace on recording surface 8 is a rough measure of efficiency of the brakes of the vehicle. If, for example, marking device 11 moves upward to the transverse division in Figure 5 corresponding to a stopping distance of 15 feet, the brakes may be assumed to be in satisfactory operating condition, at least if the trace is centered or nearly centered. On the other hand, if the marking device moves upward only to the transverse line corresponding to a stopping distance of 35 feet, which can happen if the brakes are not in good operating condition, the trace on insert 22 will graphically reveal the fact that the brakes require relining or some other kind of attention.

What is even more helpful is the fact that when the trace is not centered, the shape of the trace tends to show whether one brake takes hold before the others and, if so, which one. If, for example, the right rear brake grabs, the upward trace usually takes the form of a straight line veering off slightly to the left, while the downward trace follows a more or less trapezoidal path to the left of the upward trace, often with the major portion thereof paralleling the retaining element along the left hand edge of the slide portion. If the left front brake grabs, the upward trace usually veers off rather sharply to the right, the return trace following for the most part a straight path imposed on the marking element by the retaining element along the right hand edge of the slide portion. If it is the left rear brake or the right front brake that grabs before the others, the traces are of course mirror images of the traces just described.

In any event, the trace that is obtained is at least semi-permanent, as where it is formed as by means of chalk on the exposed top surface of slide portion 4; if it takes the form of a pencil impression on paper such as insert 22, the insert may of course be retained permanently for purposes of later examination, comparison, or use as evidence in legal proceedings.

It is apparent that modifications may be made in the brake efficiency recorder without departing from the spirit of the invention.

For example, the slide portion may, if desired, take the form of an inclined plane without any curvature of any kind; if curved, the curve need not necessarily be a parabola but may be any other curve, steeper or shallower than a parabola, which answers the needs of the particular situation. Also, the brake efficiency recorder need not necessarily consist of a separate base and slide portions held together by welding: it may, for example, be cast in one piece or made of a single piece of heavy sheet metal which in and of itself provides unitary base and slide portions. The retaining elements along the lateral edges of the slide portion may be of any desired form and in some instances can be omitted entirely. The stop at the bottom of the slide portion need not necessarily be V-shaped; if it is V-shaped, it may have an included angle which may be greater or less than 90°. Changes in the shape and construction of the marking device, particularly in the manner of mounting the marking element, may also be made.

It is intended that the patent shall cover, by summarization in appended claims, all features of patentable novelty residing in the invention.

What is claimed is:

1. A brake efficiency recorder comprising a base portion; an inclined slide portion supported by and extending upward from the base portion; retaining elements along the sides of the slide portion; a recording surface on the slide portion between the retaining elements; a stop at the lower end of the recording surface; and, for movement away from the stop in a direction extending toward the upper end of the recording surface, a movable marking device in contact with and adapted to leave a trace on the recording surface, said marking device being free to move laterally into contact with the retaining elements along the sides of the slide portion.

2. A brake efficiency recorder as in claim 1 in which the recording surface takes the form of an insert fitting between the retaining elements on the slide portion.

3. A brake efficiency recorder as in claim 2 in which one end of the insert abuts the stop on the slide portion.

4. A brake efficiency recorder comprising a flat base portion; a tangentially mounted slide portion supported by and extending upward from the base portion, said slide portion extending upward at an angle to the base portion; retaining elements along the sides of the slide portion; a recording surface on the slide portion between the retaining elements; a stop at the lower end of the recording surface; and, for movement away from the stop in a direction extending toward the upper end of the recording surface, a weighted marking device in contact with and adapted to leave a trace on the recording surface, said marking device being free to move laterally into contact with the retaining elements along the sides of the slide portion.

5. A brake efficiency recorder as in claim 4 in which the slide portion as seen in side elevation extends upward in a smooth curve from the zone of tangency with the base portion.

6. A brake efficiency recorder as in claim 5 in which the slide portion is so formed that the upward slope of the curve increases from a minimum in the zone of tangency with the base portion to a maximum at the upper end of the slide portion.

7. A brake efficiency recorder comprising a base portion; an inclined slide portion supported by and extending upward from the base portion; two opposed flanges forming grooves along the sides of the slide portion; a recording surface on the slide portion between the two grooves; a stop at the lower end of the recording surface; and, for movement away from the stop in a direction extending toward the upper end of the recording surface, a movable marking device in contact with and adapted to leave a trace on the recording surface, said marking device being free to move laterally into contact with the flanges along the sides of the slide portion.

8. A brake efficiency recorder as in claim 7 in which the two grooves extend from a point near the top to a point near the bottom of the slide portion.

9. A brake efficiency recorder as in claim 8 in which the two flanges constitute integral parts of the slide portion.

10. A brake efficiency recorder comprising a base portion; an inclined slide portion supported by and extending upward from the base portion; retaining elements along the sides of the slide portion; a recording surface on the slide portion between the retaining elements; a stop at the lower end of the recording surface, said stop having a bight therein; and, for movement away from the bight in the stop in a direction extending toward the upper end of the recording surface, a freely movable weighted marking device in contact with and adapted to leave a trace on the recording surface.

11. A brake efficiency recorder as in claim 10 in which the sides of the stop make an angle to each other.

12. A brake efficiency recorder as in claim 11 in which the apex of the angle is located at the lower end of the slide portion.

13. A marker for a brake efficiency recorder comprising a weight having a substantially flat bottom; a group of anti-friction elements in said bottom for imparting motility to the weight; a central bore extending through the weight; a spring in the bore; a spring retainer in the bore; and, projecting out of the bottom of the weight and urged by the spring in a direction away from the weight, a marking element disposed in the bore within the group of anti-friction elements.

14. A marker as in claim 13 in which the anti-friction elements take the form of freely rotatable bearing balls.

15. A marker as in claim 14 in which the body portion of the weight is peened over at the bottom of the weight to provide means for retaining the bearing balls in place.

References Cited in the file of this patent

UNITED STATES PATENTS

| | | |
|---|---|---|
| 1,875,653 | Post | Sept. 6, 1932 |
| 2,157,514 | Whipple | May 9, 1939 |
| 2,163,847 | Perrey | June 27, 1939 |
| 2,255,454 | Rust | Sept. 9, 1941 |
| 2,411,165 | McBride | Nov. 19, 1946 |
| 2,698,215 | Peck | Dec. 28, 1954 |